Sept. 29, 1931. S. S. STOLP 1,824,844
TROLLEY CONTACTOR
Filed June 11, 1928
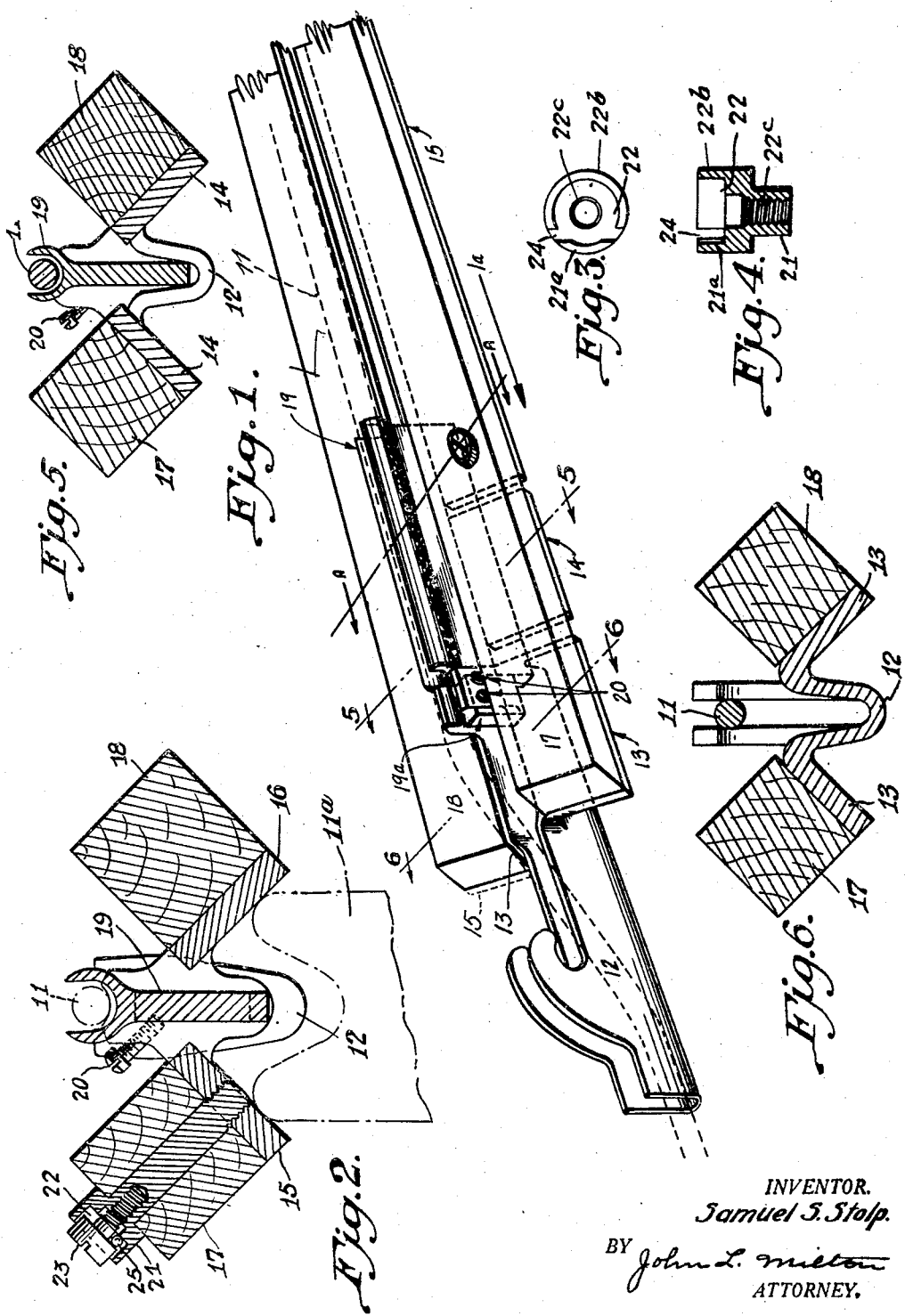
INVENTOR.
Samuel S. Stolp.
BY John L. Milton
ATTORNEY.

Patented Sept. 29, 1931

1,824,844

UNITED STATES PATENT OFFICE

SAMUEL S. STOLP, OF LOUISVILLE, KENTUCKY, ASSIGNOR TO CHEATHAM ELECTRIC SWITCHING DEVICE COMPANY

TROLLEY CONTACTOR

Application filed June 11, 1928. Serial No. 284,636.

The object of my invention is to improve the nature and construction of trolley contactors or otherwise known as trolley pans of the class and character mounted on electric railway overhead trolley wire so arranged and disposed that the trolley wheel of a car in passing is caused to leave direct contact with the trolley wire and engage sections of contactors carried by the trolley pan for the purpose of energizing solenoids of an electric switch or point throwing device disposed in the ground adjacent the rails.

An outstanding object being to prolong the life of the several members composing the trolley pan by interposing an arc barrier or arc dissipator in a more advantageous way than has been used heretofore.

For a detailed description of my invention, reference is to be had to the accompanying drawings, forming a part hereof, in which—

Fig. 1 is a perspective of a section of the trolley pan. Fig. 2 is a cross section of Fig. 1 along the line A, A. Figs. 3 and 4 are details of the terminals employed on the trolley pan as shown in Fig. 1.

Fig. 5 is a cross-sectional view on line 5—5 of Fig. 1 and

Fig. 6 is a cross-sectional view on line 6—6 of Fig. 1.

The invention is embodied in a trolley pan or trolley contactor structure which is suspended adjacent an overhead trolley wire using the latter as a locating means and support. Span wires from side mountings are usually disposed on poles or walls at the side of the road on which the trolley line operates and are tied into the trolley pan in one of the several accepted and conventional ways so that the wiring of the pan will not be displaced materially when the trolley wheel, under the spring pressure carried by a car, contacts the pan. One end of the pan is shown in Fig. 1 with the trolley wire 11 in dotted lines. The wire passes through bracket 12 and is clamped on the inside of the bottom or trough of the member by the usual cam-operating lever not shown but well known in the art and illustrated for example in U. S. patent to Kempton No. 1,166,912. The trolley wire is, therefore, bent upward and through the grooved structure 19 shown centrally at the top of Fig. 1. This same form of mounting is employed at the other end of the trolley pan. It will be noted that the trolley wheel will engage metallic facings 13, 13 and then pass on to the successive spaced pairs of metallic facings 14, 14 and 15, 16 arranged in opposed relation on opposite sides of the axis of the pan. As is evident from Fig. 1 the facings 13, 14 and 15 on one side are mounted on the bottom face of an insulated bar 17 preferably constructed of wood. In like manner the facings 13, 14 and 16 on the opposite side are supported beneath the similar bar 18. The bars 17 and 18 are connected to the facings 13, 13 and thus these bars form direct connections between the two brackets 12 at opposite ends of the device.

Proceeding in the normal direction, the trolley wheel will draw current from insulated contactor face 15 and pass on to insulated face 14 and draw an arc, embracing these two faces, which has been notably destructive of the insulating members 17 and 18. To more completely break up this arc, which not only passes from the faces, just referred to, but often reaches up to the trolley wire above and holds an arc especially during certain atmospheric conditions, the new type arc barrier 19 has been added to meet these extreme conditions.

Bracket 12 is fashioned with an elongated vertical slot on the inner or centrally disposed end into which is inserted an end 19a, formed integrally with the body 19 of the new type arc barrier, which is preferably composed of material carrying a high asbestos content. Screws 20 are threaded into the bracket 12 and engaged 19a to further locate and stabilize the arc barrier.

In Fig. 2, the arc barrier 19 is shown in substantially its full size form and in true relation to the trolley wheel. It is shown here effectively protecting the faces 15 and 16 as well as trolley wire 11. Attention is called to the fact that this barrier is completely supported by the bracket and that it does not contact in any way with other insulation, which effects perfect drainage for water and a free circulation of air, which makes for the breaking up of the destructive arc not only by its own insulation but by providing a free circulation for the heated air to carry the arc upward and away from the adjacent parts and trolley wire 11.

In Fig. 2, a bolt 21 is shown extending through insulated bar 17, the lower end being threaded into metallic facing 15 while the head of this bolt is fashioned with a countersunk opening 22 to receive flat head screw 23. The head of this bolt is cross-milled, off the center, to provide grooves 24, the bottom of which registers with the floor of countersunk opening 22, with a lip 21a and an arcuate wall 22b. Into tapped hole 22c of bolt 21, screw 23 is disposed, under the head of which is securely lodged wire 25, the lip 21a and wall 22b serving to prevent it from becoming misplaced during tightening operation.

Many variations of this structure may be made without departing from the spirit of my invention, therefore, I wish to be limited only by the following claims:

1. A trolley pan with a supporting bracket and a separable arc dissipator engaging said structure.

2. A trolley pan with a supporting bracket and a separable arc dissipator attached vertically thereto.

3. A trolley pan structure with a supporting bracket, carrying bars and a separable arc dissipator engaging said structure.

4. A trolley pan with a supporting bracket carrying insulating material with electrical contacting bars mounted on same and a separable arc dissipator attached vertically to said bracket.

5. A trolley pan with segmental electrical contacting bars carried on insulating material carried by a supporting bracket equipped with a separable arc dissipator disposed in substantially a vertical plane.

6. A trolley pan with segmental bars carried on a supporting bracket equipped with an arc dissipator disposed in substantially a vertical plane and so positioned as to provide air spaces between same and said bars.

7. A trolley pan with segmental conducting bars carried by a supporting bracket equipped with an arc dissipator disposed adjacent the gap, formed by said contacting bars, in substantially a vertical plane and so positioned as to provide air spaces between same and said bars.

8. A trolley pan with segmental bars carried on a supporting bracket equipped with an arc dissipator attached solely thereto and disposed in substantially a vertical plane and so positioned as to provide air spaces between same and said bars.

In testimony whereof I affix my signature.

SAMUEL S. STOLP.